UNITED STATES PATENT OFFICE.

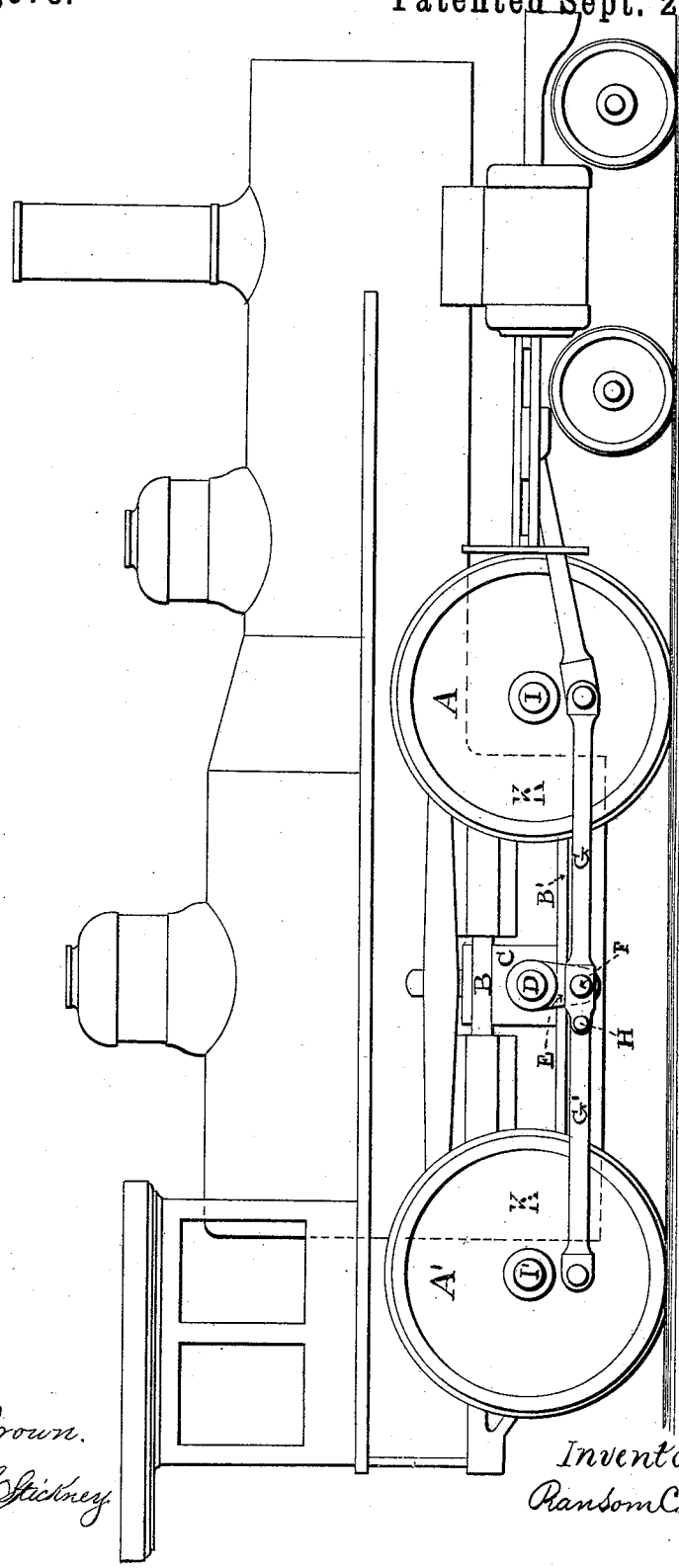

RANSOM C. WRIGHT, OF PHILADELPHIA, PENNSYLVANIA.

LOCOMOTIVE.

SPECIFICATION forming part of Letters Patent No. 349,676, dated September 21, 1886.

Application filed January 7, 1886. Serial No. 187,839. (No model.)

*To all whom it may concern:*

Be it known that I, RANSOM C. WRIGHT, a citizen of the United States, residing at Philadelphia, in the State of Pennsylvania, have invented new and useful Improvements in Locomotives, of which the following is a specification.

My invention relates to improvements in locomotive-engines; and the objects of these improvements are, first, to provide for a more extended spread of the driving-wheels; second, to enable the lengthening of the fire-box, thereby increasing the grate-area and heating-surface. I attain these objects by the mechanism illustrated in the accompanying drawing, in which the figure is a side elevation of the entire locomotive.

Similar letters refer to similar parts throughout the view.

The driving-wheels A A' are secured to the frame B B' in any of the usual methods, and midway between the driving-wheels A A', and attached to the frame B B', I place a bearing, C, on each side of the locomotive, in which bearing C, I place a journal, D, on which is attached a crank, E, with a bearing-pin, F, at its outer end, to which are attached the parallel or coupling rods G G', which couple the driving-wheels A A', thereby supporting the rods G G' at their center, the rods G G' being preferably jointed near their center at H. The support provided for the rods G G' enables their extension to a greater total length than if one continuous unsupported rod were used, and as the crank E revolves with the upward and downward motion of the rods the support is constant, thus safely permitting the spreading of the axles I I', on which the driving-wheels A A' are fixed.

The fire-box K K, I place between the axles I I' in the usual way, and its elongation or extension is permitted to the same extent that the axles I I' are spread, increasing its grate-area and also its inner or heating surface, thereby promoting slower and more perfect combustion, and consequent economy of fuel.

The crank E may be made in disk form, with the pin F secured near one side of the disk, at a distance from the center of the journal D equal to the length of the cranks of the driving-wheels A A', instead of in the form shown in Fig. 1, the disk shape affording a means of easily counterbalancing the parts attached to one side of it (the disk.)

I am aware that prior to my invention parallel or coupling rods such as I have described have been used on locomotives with three or more pairs of driving-wheels. I am also aware that prior to my invention the fire-box has been placed between the axles of the driving-wheels. I am also aware that bearings have been placed between the driving-wheels for the purpose of introducing oscillating arms, bars, or levers, which were connected directly to the cylinders and transmitted the power to the driving-wheels without the use of parallel rods. I am also aware that cranks extending across from side to side of the engine and communicating the power direct from the cylinders to the wheels, the crank being between the wheels, have been used; but such devices were of different construction and for different purposes from mine, which is primarily for the extension of the fire-box, as heretofore set forth.

I claim as my invention and desire to secure by Letters Patent—

In a locomotive-engine, a revolving crank placed between the driving-wheels, on each side, to support the parallel rods, for the purpose of safely lengthening them, and thereby permit spreading of the driving-axles, to allow the introduction of a longer fire-box, all substantially as and for the purposes set forth.

RANSOM C. WRIGHT.

Witnesses:
CHAS. H. BROWN,
WILLIAM H. STICKNEY.